United States Patent [19]
Behnke

[11] Patent Number: 5,494,337
[45] Date of Patent: Feb. 27, 1996

[54] BICYCLE WHEEL WITH A STRAIGHT THROUGH SPOKE AND HUB COMBINATION

[76] Inventor: James W. Behnke, 23263 Andretti Ave., Laguna Hills, Calif. 92653

[21] Appl. No.: 106,056

[22] Filed: Aug. 13, 1993

[51] Int. Cl.⁶ .................................................. B60B 1/04
[52] U.S. Cl. .............................. 301/59; 301/104
[58] Field of Search .................... 301/55, 59, 61, 301/104, 60; 29/894.33, 894.333

[56] References Cited

U.S. PATENT DOCUMENTS

| | | |
|---|---|---|
| 420,061 | 1/1890 | Hanson . |
| 478,394 | 7/1892 | Bretz . |
| 522,813 | 7/1894 | Welch . |
| 582,486 | 5/1897 | Rowe . |
| 607,175 | 7/1898 | Keating . |
| 611,323 | 10/1898 | Fraser ................................. 301/61 |
| 748,684 | 1/1904 | Andersen . |
| 907,282 | 12/1908 | Pugh .......................... 29/894.333 X |
| 1,338,410 | 4/1920 | Williams . |
| 1,353,394 | 9/1920 | House, Jr. ............................ 301/59 |
| 1,388,021 | 8/1921 | Budd .................................. 301/59 |
| 1,824,888 | 9/1931 | Hecht ............................... 301/60 X |
| 1,923,476 | 8/1933 | Booth .............................. 301/60 X |
| 1,975,221 | 10/1934 | Booth ............................. 301/59 X |
| 4,448,456 | 5/1984 | Pfundstein . |
| 4,626,036 | 12/1986 | Hinsberg . |
| 4,880,280 | 11/1989 | Panzica . |

FOREIGN PATENT DOCUMENTS

| | | | |
|---|---|---|---|
| 1418678 | 10/1965 | France | ................................... 301/60 |
| 2417402 | 10/1979 | France | .............................. 301/110.5 |
| 2377 | of 1890 | United Kingdom | ................... 301/60 |

*Primary Examiner*—Russell D. Stormer

[57] ABSTRACT

A strong, light weight and high performance hub is described for use in a spoked wheel in which the hub is connected to a rim by a plurality of spokes. The hub is provided with two bell-shaped end flanges which are integral. Two rings of bores are defined in each end of the flanges. The bores are paired between the rings, one bore in the outer ring being substantially adjacent to one bore in the adjacent inner ring. The angle of definition of each of the bores in the hub flange tends to orient a spoke disposed therethrough at an angle to a plane perpendicular to the longitudinal axis of the hub of about 20 degrees. When the spoke is attached to the rim, it is gently pulled or bent outward so that the angle to the plane perpendicular to the axis of the hub is reduced or in the illustrated embodiment, reduced to 9 degrees or less. The gentle bend in the spoke prevents the spoke from loosening after the initial truing and tensioning even if the spoke wheel is repeatedly subjected to high impulsive stresses. The hub also provides a light weight, strong and simple assembly for providing bearing support for an axle disposed through the hub.

14 Claims, 6 Drawing Sheets

BICYCLE WHEEL WITH A STRAIGHT THROUGH SPOKE AND HUB COMBINATION

BACKGROUND OF THE INVENTION

1. Field of the Invention

The invention relates to the field of bicycles, and in particular to bicycle hubs coupled to the rim through a plurality of substantially straight spokes.

2. Description of the Prior Art

The assembly of a bicycle wheel from a circular rim coupled through plurality of spokes to a hub through which an axle is disposed is very well known. Many of such wire spoke wheels utilize spokes connected to the hub by disposition of the spoke through a bore defined in the hub and retention of the spoke within the hub and bore by means of an expanded head. Typically, such spokes may involve a sharp angled bend which functions as a hook so that the spoke is retained in the hub. The opposing end of the spoke is then directed to a bore defined through the rim and tensioned between the hub and the rim by means of a threaded nipple disposed on the end of the spoke and having an expanded head bearing against the bore defined in the rim. Such bent spokes, however, in mountain and road bikes, which are subjected to high impulsive forces, are prone to break or fail, typically at or near the sharp angle in the spoke.

Many other types of spoke wheel designs are known which utilize straight spokes, that is spokes having no sharp angled bend in them to couple with the hub. Such straight or substantially straight spokes can be found in Welch, *Wheel for Vehicles*," U.S. Pat. No. 522,813 (1894); Keating, "*Wheel*," U.S. Pat. No. 607,175 (1898); Bretz, "*Bicycle Wheel*," U.S. Pat. No. 478,394 (1892); Williams, "*Wire Wheel*," U.S. Pat. No. 1,338,410 (1920); Hanson, "*Velocipede Wheel*," U.S. Pat. No. 420,061 (1890); Rowe, "*Wheel*," U.S. Pat. No. 582,486 (1897); Andersen et al., "*Vehicle Wheel*," U.S. Pat. No. 748,684 (1904); Panzica et al., "*Motorcycle Wheel Hub and Flange Assembly*," U.S. Pat. No. 4,880,280 (1989); Hinsberg et al., "*Spoke Wheel*," U.S. Pat. No. 4,626,036 (1986); and Pfundstein, "*Wire Spoke Wheel Hub Assembly*," U.S. Pat. No. 4,448,456 (1984). In prior art designs with straight spokes, the use of a plurality of fastening pieces, brazing or welding, lock rings or combination of lock rings and nuts, are often necessary components in order to achieve a hub assembly which meets the needs required of the application. For example, Hinsberg describes at column 2, lines 13–25 and 52–59, the need for a lock ring. Welch describes at column 2 lines 57–72, a requirement for a specially slotted conical nipple in order to affix the spoke within the hub and rim assembly. Hanson at column 1 lines 27–29, 42–48, in column 2 lines 51–53, discusses the need for a special nipple and spoke attachment to the hub and the use of special spokes. In Rowe at column 1 lines 41–44, and column 2 lines 71–74, the use of a peripheral flange having particularly formed slots or openings in combination with specially formed spokes is cited as necessary in order to achieve a hub and rim assembly with sufficient strength. Pfundstein describes at column 2 lines 61–4, column 5 lines 2–5 and 19–25, in column 6 lines 3–13, a plurality of specially made parts which are required in order to fabricate an acceptable motorcycle hub and rim assembly. In Williams at column 2 lines 106–09, column 3 lines 7–9 and 26–29, and column 4 lines 52–67, a requirement for cover rings, nuts and bolts is made. In Andersen at column 1 lines 30–31, column 2 lines 82–87, column 3 lines 13–34 and 44–45, and in FIG. 5, the need for a circlip, ring and special spokes is recited. In Panzica in FIGS. 1 and 2 and in particular in column 1 lines 33–37 and 67–69, column 2 lines 42 and 43, in column 4 claims 2 and 8, multiple components is necessary for a combination in a multiple flanged hub for use in a motorcycle. Bretz describes in column 1 lines 19–21 and 39–41, column 2 lines 55–62, and column 4 lines 52–57, the use of a gear-shaped hub having extending tabs in offset relationship. A similar gear-shaped hub is shown by Keating as described at column 1 lines 15–19, 34–37, and 47–51, in column 2 lines 64–68. However, these gear-shaped or spurred hubs are characterized by having additional weight and mass which is a penalty in a light weight high performance mountain bike.

Therefore, what is needed is some type of design for a rim and hub assembly coupled together with conventional standard straight through spokes which provides a strong, yet light combination equaling or exceeding the strength of prior hub and wheel assemblies, but which is fabricated using conventional materials and conventional straight spokes and rims without the need for additional fasteners and modifications of the rims or spokes.

BRIEF SUMMARY OF THE INVENTION

The invention is an improvement in a wire wheel comprised of a rim having an axis of rotation, and a hub having a longitudinal axis disposed on the axis of rotation of the rim and a having an integral, rigid hub flange. A plurality of straight spokes are coupled to the hub to the rim. The hub has a plurality of bores defined through the hub flange into which the spokes are disposed. The bores define an initial untensioned spatial orientation of the spoke with respect to the hub and rim. The spokes are fastened to the rim and tensioned between the hub and rim. The bores defined in the hub are arranged and configured relative to attachment of the spoke to the rim so that each of the spokes has a predetermined gentle bend defined along its length after it has been tensioned between the hub and rim. This gentle bend serves to fix the spoke within the hub so that it does not appreciably loosen after initial usage of the spoked wheel.

Each of the spokes is provided with a head and the bores defined in the hub are provided with conforming surfaces to seat with the head. The head is securely seated within the conforming surfaces when tensioned with the predetermined bend in the spoke.

The hub is an integral piece and the hub flange is bell-shaped. The bores is defined in the integral bell-shaped hub flange so that the hub flange provides a rigid and strong element for holding the spokes relative to the rim.

The hub comprises an axle disposed on the longitudinal axis of the hub and a pair of sealed bearings at each end of the axle. The hub has a counterbore defined within the hub flange into which the sealed bearings are fixed. The sealed bearings support the axle within the hub. The hub flange in the proximity of the counterbores is integral and bell-shaped to provide a rigid element for holding the sealed bearings within the hub without binding of the bearings.

The bores defined in the hub are defined within the hub flange in two concentric ring arrangements. One of the ring arrangements is longitudinally disposed inside of the other one of the ring arrangements of bores. Each bore on one ring arrangement within the hub flange is defined therethrough adjacent the bore on the other ring arrangement of bores defined in the hub flange. In this manner, the bores form adjacent pairs circumferentially defined through the hub flange.

The adjacent pairs of bores have substantially equal inward angular inclinations from a plane perpendicular to the longitudinal axis of the hub and have approximately equal, but opposite azimuthal inclinations with respect to a radial plane through the hub intersecting the bores.

In the illustrated embodiment the azimuthal angle between spokes disposed through adjacent bores is a minimum of approximately 71.64 degrees. The inward angle each of the bores from the plane perpendicular to the longitudinal axis is approximately 20 degrees. Each of the spokes disposed in the bores and coupled to the rim has an angle from the plane perpendicular to the longitudinal axis of the hub of approximately 8 to 9 degrees after the spoke is tensioned and trued between the hub and the rim.

The invention can also be characterized as an improvement in a hub for a spoked wheel having a plurality of straight spokes coupling the hub to the wheel comprised of an integral, rigid bell-shaped hub flange formed at each end of the hub, a first and second ring of bores defined through the flange for receiving the spokes. The bores have an angular orientation defined within the flange such that the spokes are gently bent from the angular orientation originally defined for the spokes by the bores, when the spokes are disposed through the bores, to a different angular orientation, when the spokes are coupled to the wheel and tensioned between the wheel and hub. As a result, a light, strong, high performance spoked wheel is provided in which the spokes retain their original tension and truing after usage despite high impulsive forces is are applied to the spoked wheel.

The angle of projection of the spokes to the rim is defined by the bores as a first predetermined magnitude relative to a horizontal plane perpendicular to the longitudinal axis of the spoked wheel. The plurality of spokes has a second predetermined angular projection to the rim from the plane perpendicular to the longitudinal axis of the spoked wheel when the spokes are tensioned between the hub and the spoked wheel. The first predetermined magnitude of the angular projection is approximately at least as twice as great as the second predetermined magnitude of the angular projection.

In the illustrated embodiment the first predetermined angular projection is approximately 20 degrees, and the second predetermined angular projection is approximately between 8 and 9 degrees.

The first ring of the bores and the second ring of the bores are substantially adjacent to each other. One ring is radially disposed within the flange longitudinally inward with respect to the other ring.

The invention is also a method of assembling a spoked wheel having a hub and a plurality of spokes coupling the hub to the spoked wheel such that the spokes remain fixed in their substantially originally trued condition even after the spoked wheel is subjected to high impulsive stresses. The method comprises the steps of providing a rigid, integral hub having bell-shaped hub flanges on opposing ends of the hub. A plurality of spoke bores are defined in the bell-shaped flange at an angle with respect to a plane perpendicular to the longitudinal axis of the hub. The angle has a first predetermined magnitude. The plurality of spokes are disposed through the bores. Each spoke has an element for preventing the spoke from being pulled through the bore. The opposing end of the spokes are coupled to the spoked wheel while the spokes are simultaneously bent by a second predetermined amount so that a torque is applied to the spoke tending to bend the spokes in a plane lying parallel to the longitudinal axis of the hub.

The step of simultaneously bending bends the spokes outwardly in order to decrease the angle of projection of the spoke from the plane perpendicular to the longitudinal axis of the hub. The spoke is bent outward from the center of the spoked wheel to reduce the angle of the spoke from the plane perpendicular to the longitudinal axis of the hub by at least 50 percent of the angle of the spoke from the plane prior to the step of bending.

The invention may be better visualized by now turning to the following drawings wherein like elements are referenced by like numerals.

The invention and other embodiments can now be better understood by turning to the following detailed description.

DETAILED DESCRIPTION OF THE PREFERRED EMBODIMENTS

A strong, light weight and high performance hub is described for use in a spoked wheel in which the hub is connected to a rim by a plurality of spokes. The hub is provided with two bell-shaped end flanges which are integral. Two rings of bores are defined in each end of the flanges. The bores are paired between the rings, one bore in the outer ring being substantially adjacent to one bore in the adjacent inner ring. The angle of definition of each of the bores in said hub flange tends to orient a spoke disposed therethrough at an angle to a plane perpendicular to the longitudinal axis of said hub of about 20 degrees. When the spoke is attached to the rim, it is gently pulled or bent outward so that the angle to the plane perpendicular to the axis of the hub is reduced or in the illustrated embodiment, reduced to 9 degrees or less. The gentle bend in the spoke prevents the spoke from loosening after the initial truing and tensioning even if the spoke wheel is repeatedly subjected to high impulsive stresses. The hub also provides a light weight, strong and simple assembly for providing bearing support for an axle disposed through the hub.

The hub as described below provides an improved design for a straight-pull spoke and is specifically illustrated in connection with a high performance light weight mountain bike. The invention is not limited to bicycles, but may be used in other applications including motorcycles, wheelchairs and any other application utilizing a spoked wheel. The characteristics achieved by the hub, spoke and rim assembly of the invention is increased strength that provides a wheel more resistant to failure to high and/or impulsive tensile, compressive and side loading and requires less maintenance in that less labor is required in truing or adjusting the spoke tension to keep the wheel true. As will become apparent in the following description, the wheel assembly of the present invention requires less labor than is typical of prior art designs, and does not require excess parts machining or usual nonstandard parts, such as special fittings, washers, special slots, special rims or special spokes. As a result, the wheel hub assembly of the invention is less expensive to manufacture and easier to assemble.

An additional feature in the invention is a reduction in the outside diameter of the hub in order to reduce weight. Therefore, what results is a strong, yet light weight hub which is still not subject to the flexing that occurs in most conventional wire wheels.

An added feature of the invention is that after assembly and use has begun, the spokes do not unfasten or loosen as is common with many other types of gear-shaped hubs used in mountain bikes, but maintain their original tension.

Figure 1:
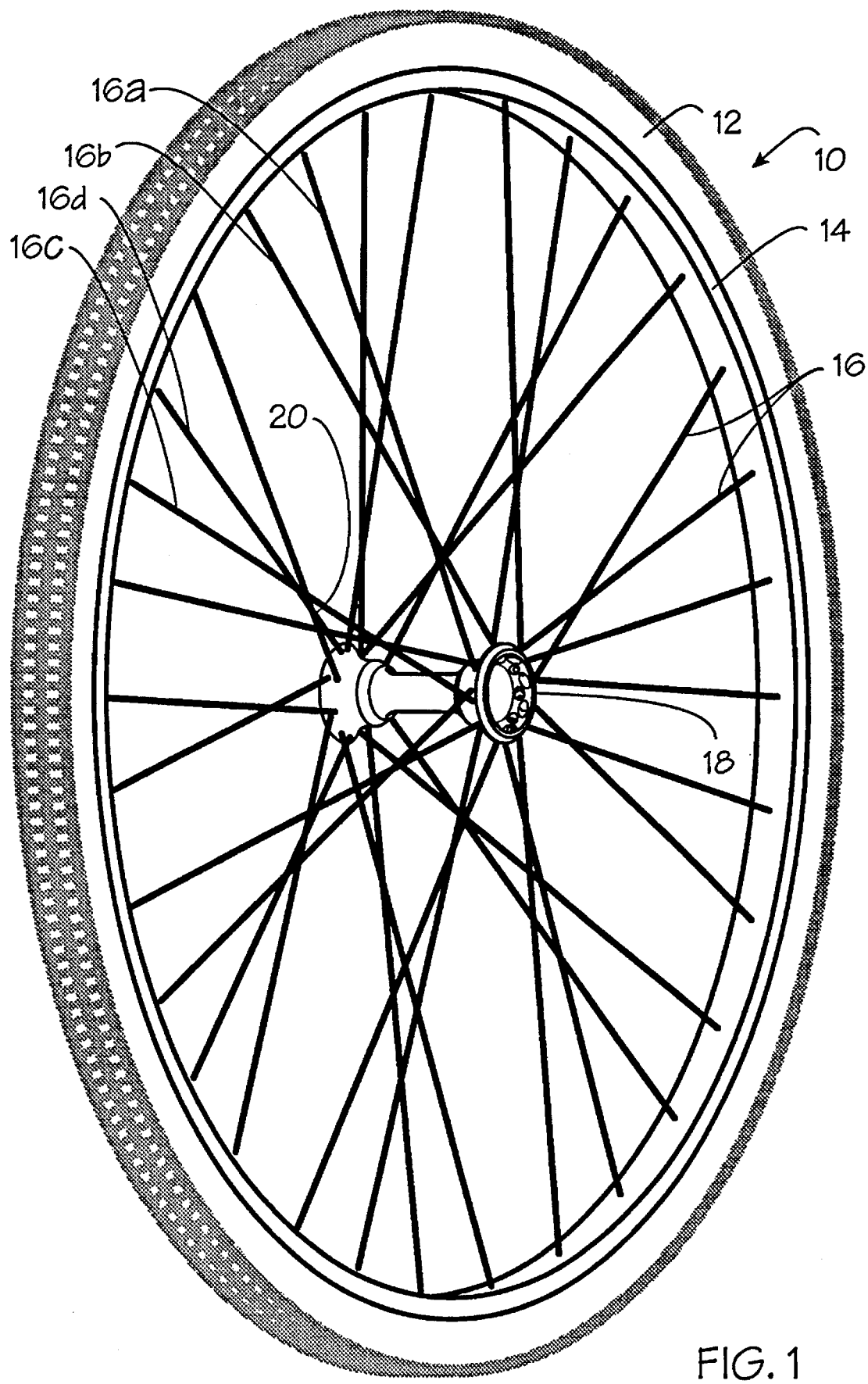
FIG. 1 is a simplified perspective view of a spoked wheel comprised of a tire, rim, spoke and hub assembly devised according to the invention.

Turn now to FIG. 1 wherein a wire wheel, generally denoted by reference numeral 10, is depicted in perspective view. A tire, usually a pneumatic treaded tire 12, is mounted on a conventional metallic rim 14. Solid tires or any other type of road or surface bearing element could be substituted without affecting the scope of the invention as claimed below. Rim 14 in turn is coupled through a plurality of conventional straight spokes 16 to axial hub 18. The spoke arrangement in FIG. 1 is referred to generally as a double cross wiring. For example, spoke 16a crosses only a second spoke 16b as it extends from hub 18 to rim 14. Spoke 16a is connected to hub 14 at a bore defined in the hub at or next to which is disposed a second spoke 16c. Therefore, at each radial spoke position on the circumference of hub 18 two spokes are attached and extend to rim 14. At each radial spoke position on the circumference of hub 18, a spoke 16 extends or is laced across the next adjacent spoke 16 and attaches to rim 14 at an adjacent bore hole to the laced spoked. For example, spoke 16d is azimuthally adjacent to spoke 16c on the circumference of hub 18 and spokes 16c and d cross at about intersection 20 as they extend to rim 14 and are fixed through a conventional nipple into a bore (not shown) on rim 14 in adjacent azimuthal positions on rim 14.

Figure 2:
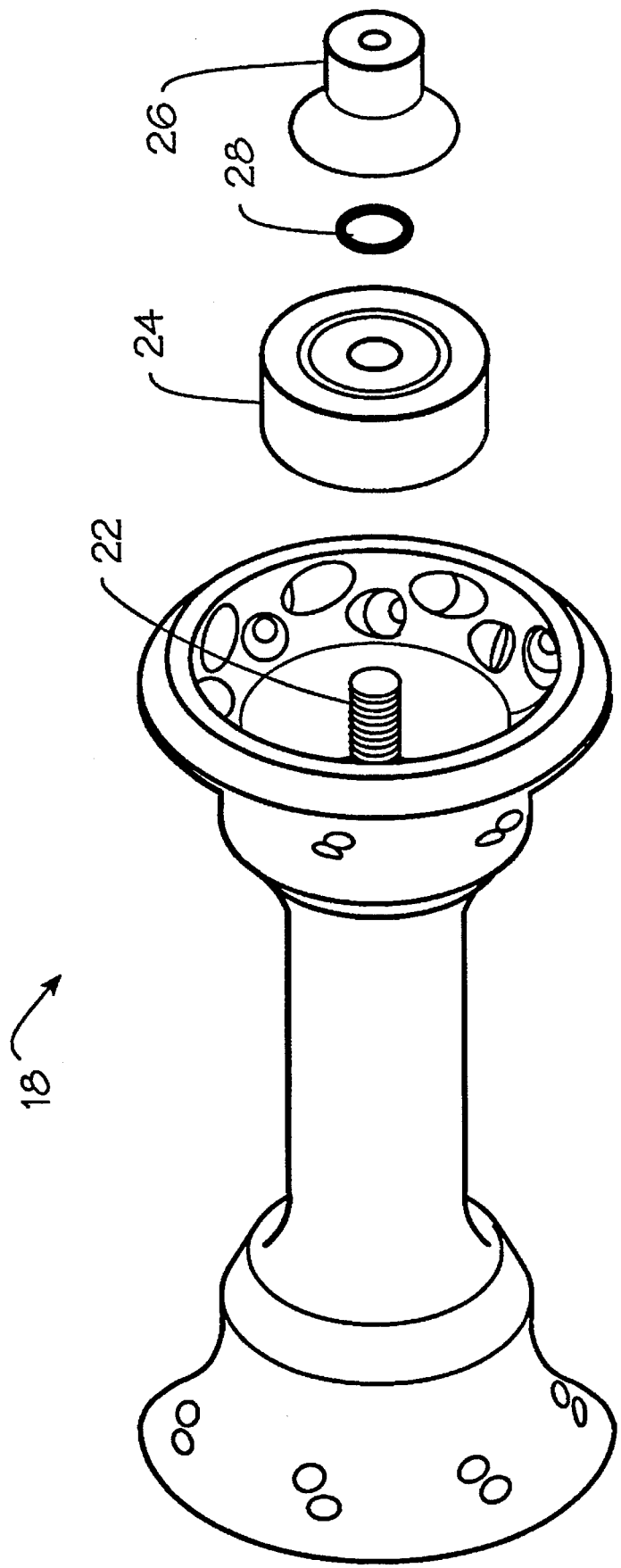
FIG. 2 is an exploded perspective view of the hub of FIG. 1 shown in isolation of the spokes and rim.

FIG. 2 is a perspective view of one embodiment of hub 18 devised according to the invention shown in isolation of the remaining elements of the wheel, spoke and hub combination of FIG. 1. Hub 18 is provided with axle 22 shown in greater detail in FIG. 3 into which a conventional ball bearing assembly 24 is press fit. Axle 22 is then provided with end spacers 26, only the right one of which is shown in FIG. 2. Spacer 26 is held on to axle 22 by means of an O-ring 28 which snaps into a groove provided within spacer 26 as better depicted in the longitudinal cross sectional view of FIG. 3. In the illustrated embodiment, bearings 24 are sealed press fit bearings which are pressed in to counterbores 38 defined in each end of hub 18. The combination of the sealed press fit bearings in the counterbores defined in the body of the ends of hub 18, keep bearings 24 from binding or collapsing. Although the particular bearing configuration shown in FIG. 3 is preferred, it is to be expressly understood that many other types of bearing combinations and arrangements may be used in connection with hub 18, and hub 18 appropriately modified as needed without departing from the spirit and scope of the invention.

Figure 3:
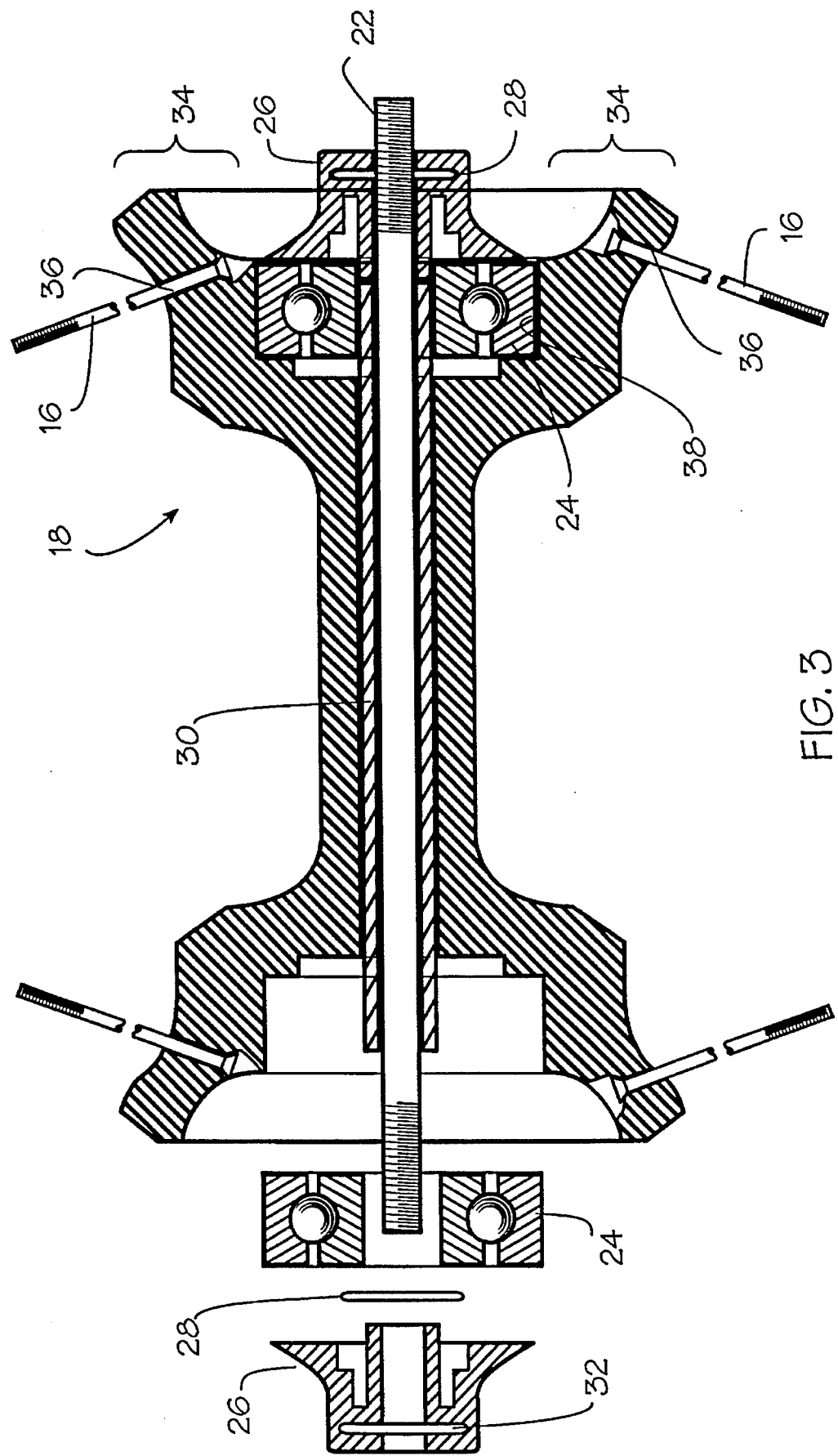
FIG. 3 is a longitudinal cross sectional view of the hub of FIGS. 1 and 2 shown with one end in exploded cross sectional view.

FIG. 3 illustrates in cross section that axle 22 is slidingly disposed within hub 18 within a sleeve 30 which centralizes axle 22 within hub 18. O-ring 28 is disposed within a groove 32 in spacer 26 and tends to hold spacer 26 by friction onto axle 22. As depicted in FIG. 3, hub 18 is provided with a bell-shaped or flared end hub flange portion 34. Straight spokes 16 are disposed into countersunk bores 36 defined in hub flange 34.

Figure 4:
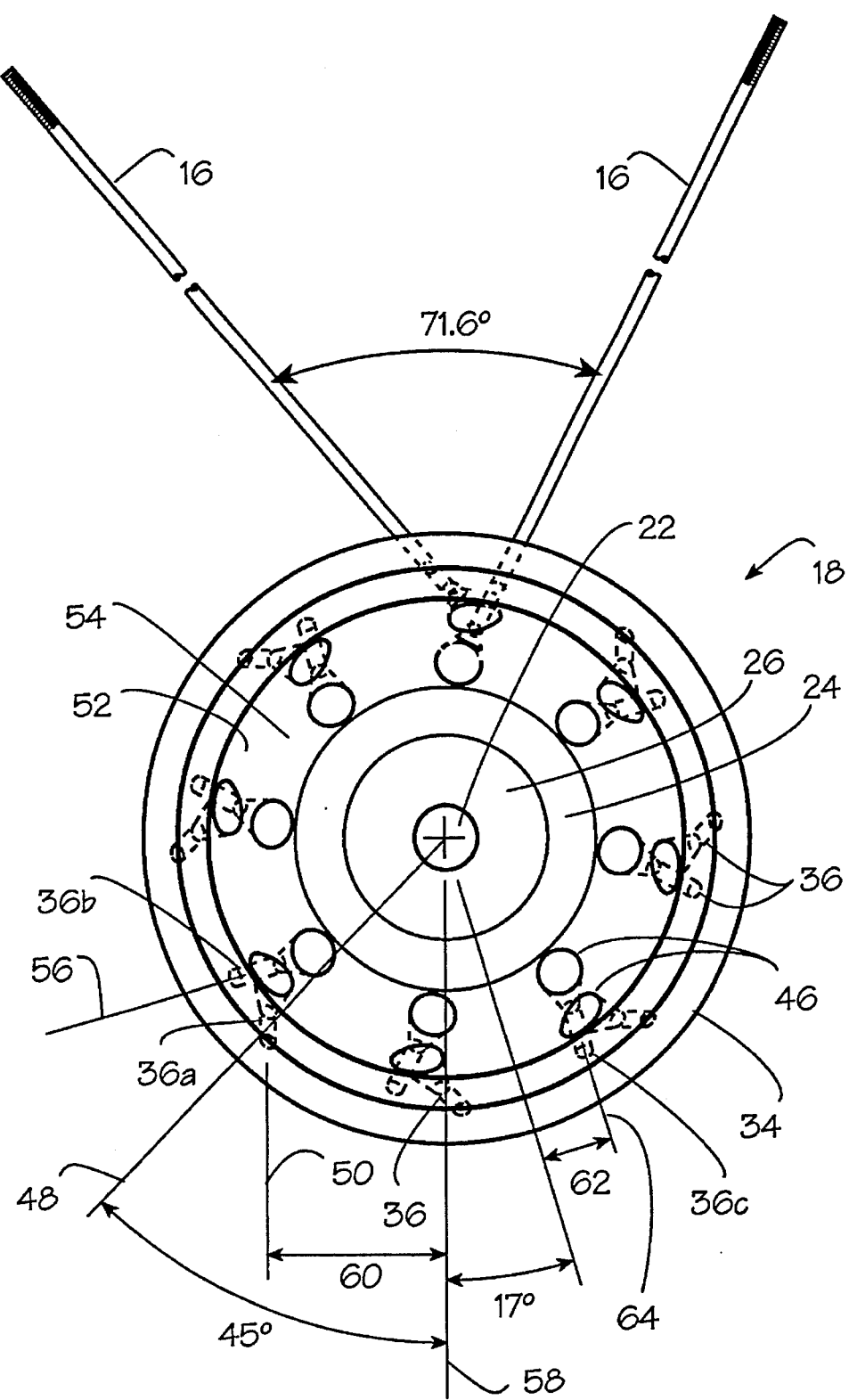
FIG. 4 is an end plan view of the hub of FIG. 3 depicting the angles of the spoke holes and spokes in the hub end.

Consider now the angles at which bores 36 are defined within hub flange 34 as best depicted in the end elevational view of FIG. 4. At each azimuthal position on hub 18, a pair of bores 36 are defined through which spokes 16 are inserted. As depicted in side cross sectional view of FIG. 5 in which one end of hub 18 is illustrated, spoke 16 makes an approximate 20 degree inward angle with respect to the perpendicular 40 to longitudinal axis 42 of hub 18. Spoke 16 is provided with a conventional head 44 which is disposed within a counterbored well 46 defined in the inner end of bore 36.

Figure 5:
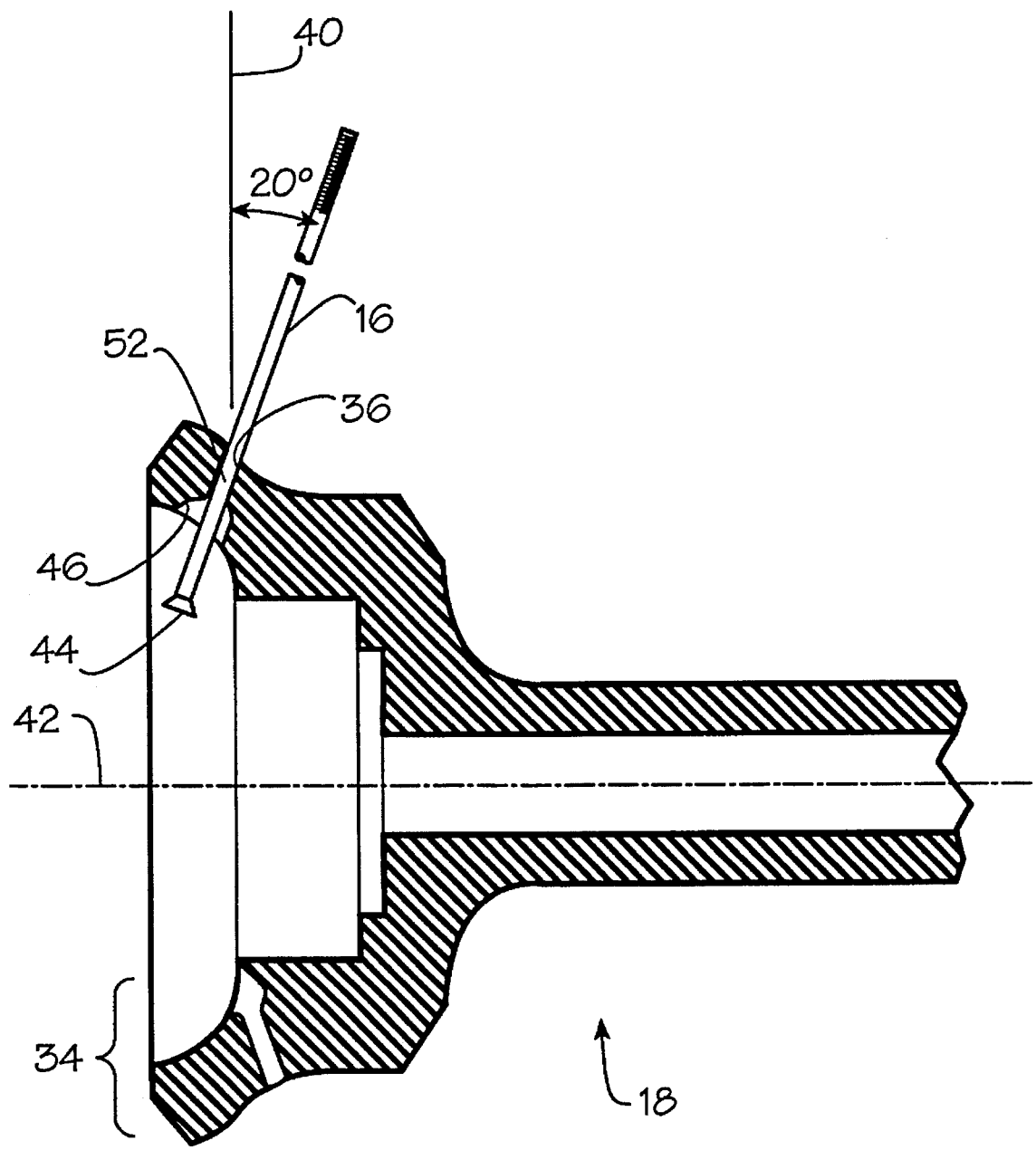
FIG. 5 is a partial cross sectional view of the hub of FIGS. 1–4 illustrating the insertion of the straight spoke.

FIG. 4 illustrates how bores 36 are defined in hub flange 34. The hub is set in a fixture of which angles the hub so that a drill can be placed against the inner surface of hub flange 34 of about angle 20 degrees from the plane 40, which is perpendicular to longitudinal axis 42 of hub 18 as best depicted in FIG. 5. Drilling from the inside of the flange permits the countersinks to be drilled at the same time with a step drill or with a second tool without handling the part a second time. A hole is drilled in what will become the outer ring 52 of bores defined within hub flange 34. The drill is first placed upon a centerline 58 and then moved a distance 60 to the left, which in the preferred embodiment is 0.5 inch, as shown in FIG. 4 to drill hole 36a as described above with the drill being held in a vertical position indicated by line 50 in FIG. 4.

Thereafter, the remaining seven of the eight holes drilled in the outer ring 52 of flange 34 are drilled by indexing hub 18 by 45 degrees between each bore or drilling operation.

Once outer ring 52 of bores 36 is complete, inner ring 54 is then drilled. Prior to drilling inner ring 54, hub 18 is indexed 18.36 degrees about its longitudinal axis from the position of the last hole in outer race 52 to place the first hole in the inner ring in line with the intended hole on the rim. The drill bit is then shifted by a distance 62 to the right, which in the preferred embodiment is 0.4 inch, to a new oriented centerline 64 as shown in FIG. 4. Thence, the first bore 36c of the inner ring 54 is drilled. In the illustrated embodiment, inner bore 54 is drilled approximately 0.072 inch radially inward along the longitudinal axis 42 of hub 18 from outer ring 52. In the same manner as is provided for drilling the eight bores 36 of outer ring 52 the inner eight bores 36 of inner ring 54 are drilled by indexing hub 18 by 45 degrees between each drilling operation.

Bores 36 on one end of hub 18 are now defined. Hub 18 is then turned end-for-end to finish the opposite flange 34. However, prior to initiating the drilling of bores 36 in the opposite flange 34, hub 18 is aligned and indexed approximately 11 degrees 15 minutes from corresponding bores on the opposing flange of hub 18. The sequence of operations just described above for forming the outer ring 52 and inner ring 54 of bores 36 is then repeated in identical manner in the opposing flange. The result is that the bores 36 will be in alignment with the holes in a rim (not shown) in a 32 spoke combination using a double crossing pattern to lace up and true spokes 16.

It must be understood that there are many different types of hole patterns which may be used depending upon the particular spoke wheel configuration chosen. In the illustrated embodiment, a 32-spoke pattern has been shown. However, the invention may be modified according to its teachings in a similar manner to make spoked wheels containing 36, 28, 24, 18 laced spokes or radial spokes.

Still further, it must be expressly understood that the rear or drive wheel of a bicycle may contain a combination of different spoke patterns. For example, the drive side of a rear wheel may be laced for a 32 or 36 spoked wheel while the opposing side or nondrive side of the rear wheel is laced radially. In each case, the particular hole pattern in hub 18 will be appropriately modified according to conventional design principles, but will be performed in a manner consistent with the teachings of the invention and as claimed below.

As depicted in FIGS. 4 and 5, each bore 36 is provided with a counterbore 46 which allows the seating of head 44 of spokes 16. The diameter of each bore 36 is sufficient to allow an easy slip fit of the body of spoke 16 but not head 44. Counterbore 46 is arranged and configured to provide a generally conforming, receiving surface for head 44 of spoke 16. In the preferred embodiment, bores 36 on rings 52 and 54 are placed as closely together as possible to each other as is reasonably permitted by the size of adjacent counterbores 46. Slight overlap in counterbores 46 and adjacent rings 52 and 54 may be permitted if desired.

Figure 6:
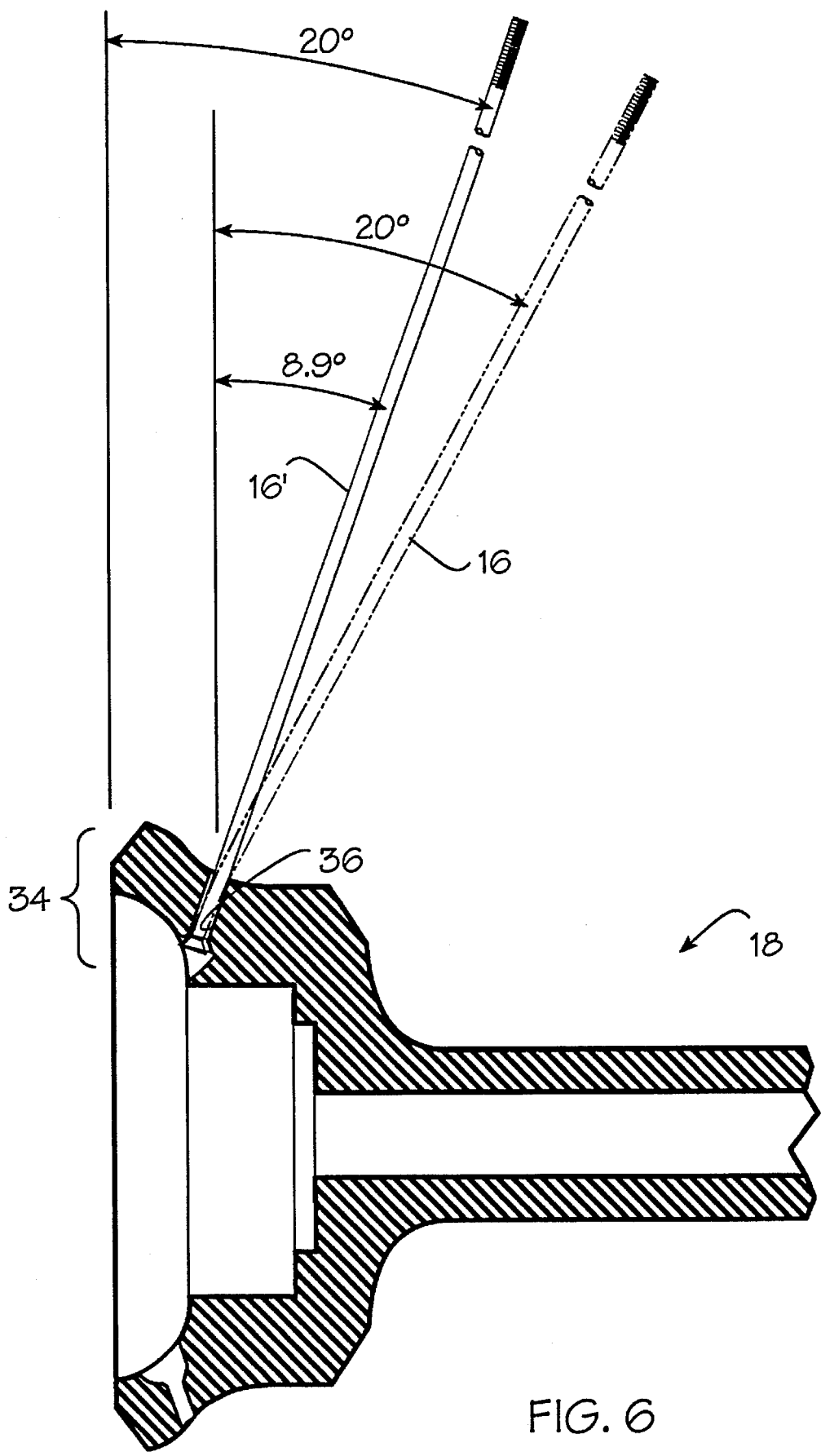
FIG. 6 is a cross sectional view of FIG. 6 shown after the spoke has been inserted and then angled according to the invention.

The hub and angle orientation of position of bores 36 through hub flange 34 now having been described, turn to FIG. 6 wherein bending of spoke 16 is described in connection with tensioning or assembly of spoke 16 on hub 18 to the rim. FIG. 6 is a cutaway longitudinal cross sectional view of hub 18 shown with spoke 16 fully seated within hub flange 34. Spoke 16 is shown in dotted outline in FIG. 6 is the position of spoke 16 when first inserted into bore 36 of hub 18 and before spoke 16 has been attached to or tensioned to rim 34, which has been omitted from the depiction of FIG. 6 for clarity. A conventional spoke nipple, not shown, is attached to the end of spoke 16, the end of spoke 16 disposed through a bore and rim 34 in the conventional manner and the nipple tightened. In disposing spoke 16 through the corresponding bore in rim 34, it is necessary to bend or curve spoke 16 slightly to the position shown as 16' in solid outline in FIG. 6. As each of the spokes are tightened on the rim, the bend assumes a final configuration as determined by the relative positioning of hub, spokes and rim. The bore is defined in the rim to which the spokes are fastened and are equally spaced along its inner circumference. The angle of the bore defined through the rim 34 is largely immaterial due to the thinness of the rim and the tolerances provided between the outer diameter of spoke 16 and the rim bore.

The geometry which determines the amount of bend between spoke 16 in its untensioned position shown in dotted outline and its tensioned position shown in solid outline 16' in FIG. 6, is determined by the angular orientations of bores 36 and hub 34 as described above. The inward bend of 20 degrees is decreased to approximately 8–9 degrees after spoke 16 is tensioned. In the illustrated embodiment it is 8.89 degrees. After tensioning, the azimuthal angle between two adjacent spokes 16 as shown in FIG. 4 is a minimum of approximately 71.64 degrees.

As a result of the bending of each of spoke 16 when tensioned, it has been found that spoke 16 becomes securely positioned within hub 18 and will not rotate or loosen after being trued or tensioned. Although it is not entirely understood, it is observed that the unique bend provided by the hub design keeps spoke 16 from turning or the nipple from loosening during use. No special head 44 or spoke 16 is required to achieve this result. The elimination of the additional fasteners not only decreases manufacturing costs and assembly costs, but also reduces the weight of the wheel assembly.

Furthermore, hub 18 as illustrated in FIGS. 1–6 is an integral hub which exhibits high strength and rigidity, but is fabricated using conventional materials, such as aluminum or titanium for fabrication. In addition, hub 18 is fabricated with substantial less machining that is characteristic of many of the other types of hubs. For example, gear-shaped hubs such as shown in Keating or Bretz require considerably more machining and after tensioning, the machined tabs which accommodate the straight spokes have a tendency to twist or torque. The spokes then rotate so that both the spoke and the nipples become loosened. After a period of initial break in usage, a wire wheel with such a design must be retensioned and retrued in order to be operable.

The bend that is formed in spoke 16 as it assumes position 16' is a gentle bend and does not set up any appreciable stresses or concentrated stress points in spoke 16. Therefore, when the hub, spoke and rim combination of the invention is subjected to extremely high impulsive forces, spoke 16 is unlikely to break, as has been observed to be common with spokes with angled heads. However, because of the slight bend in spoke 16 as provided, spoke 16 does not loosen after being subjected to heavy impulsive loads or lose its truing as is the case with prior art designs utilizing straight through spokes.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. The following claims are, therefore, to be read to include not only the combination of elements which are literally set forth, but all equivalent elements for performing substantially the same function in substantially the same way to obtain substantially the same result.

The claims are thus to be understood to include what is specifically illustrated and described above, what is conceptionally equivalent, and also what essentially incorporates the essential idea of the invention. For example, a new and different means for performing the same function, but in an entirely different way, can be substituted for any of the claimed means below, if and whenever such means is or becomes known in the art to be a substitute for the claimed means.

We claim:

1. An improvement in a wire wheel comprising:

a rim having an axis of rotation;

an hub having a longitudinal axis disposed on said axis of rotation of said rim and a having an integral, rigid hub flange;

a plurality of spokes, which are originally straight prior to disposition and tensioning between said rim and hub, said spokes for coupling said hub to said rim and having a head and a threaded end, said hub having a plurality of bores defined through said hub flange into which said head of said spokes are disposed, said bores defining an initial untensioned spatial orientation of said spoke with respect to said hub and rim; and a corresponding plurality of threaded nipples for coupling each threaded end of said spokes to said rim and for adjusting tension on each of said spokes by turning said threaded nipple on said threaded end of said spoke, said bores defined in said hub being arranged and configured relative to attachment of said spoke to said rim so that each of said spokes has a predetermined bend dynamically defined in said spoke as a result of tensioning said spoke between said hub and rim, said dynamically defined bend being defined proximate to said head of said spoke in engagement with said hub so that said spoke is rotationally fixed by said dynamically defined bend within said hub and does not appreciably loosen during usage of said wire wheel.

2. The improvement of claim 1 wherein said bores defined in said hub are provided with conforming surfaces to seat with said head, said head being securely seated within said conforming surfaces when tensioned with said predetermined bend in said spoke.

3. The improvement of claim 2 wherein said hub is an integral piece and said hub flange is bell-shaped, said bores being defined in said integral bell-shaped hub flange so that said hub flange provides a rigid and strong means for holding said spokes relative to said rim.

4. The improvement of claim 1 wherein said hub is an integral piece and said hub flange is bell-shaped, said bores being defined in said integral bell-shaped hub flange so that said hub flange provides a rigid and strong means for holding said spokes relative to said rim.

5. The improvement of claim 1 wherein said hub comprises an axle disposed on said longitudinal axis of said hub and a pair of sealed bearings at each end of said axle, said hub having defined therein a counterbore within said hub flange into which said sealed bearings are fixed, said sealed bearings supporting said axle within said hub, said hub flange in the proximity of said counterbores being integral and bell-shaped to provide a rigid means for holding said sealed bearings within said hub without binding of said bearings.

6. The improvement of claim 3 wherein said hub comprises an axle disposed on said longitudinal axis of said hub and a pair of sealed bearings at each end of said axle, said hub having defined therein a counterbore within said hub flange into which said sealed bearings are fixed, said sealed bearings supporting said axle within said hub, said hub flange in the proximity of said counterbores being integral and bell-shaped to provide a rigid means for holding said sealed bearings within said hub without binding of said bearings.

7. The improvement of claim 1 wherein each bore defined in said hub flange has an inward angle from a plane perpendicular to said longitudinal axis of said hub of approximately 20 degrees; and wherein each of said spokes disposed in said bores and coupled to said rim has an angular projection from said plane perpendicular to said longitudinal axis of said hub of approximately 8 to 9 degrees after being tensioned and trued between said hub and said rim.

8. An improvement in a hub for a spoked wheel having a plurality of straight spokes coupling said hub to said wheel comprising:

an integral, rigid bell-shaped hub flange formed at each end of said hub; and a first and second ring of bores defined through said flange for receiving said spokes, said bores having an angular orientation defined within said flange such that each of said spokes are dynamically bent from the angular orientation originally defined for said spokes by said bores when said spokes are disposed through said bores to a different angular orientation when said spokes are coupled to said wheel and tensioned between said wheel and hub to substantially prevent rotation of said spokes in said hub and consequent loss of tensioning of said spokes after initial tensioning and truing during usage of said wheel, whereby a light, strong, high performance spoked wheel is provided in which said spokes retain their original tension and truing after usage despite high impulsive forces being applied to said spoked wheel.

9. The improvement of claim 8 wherein the angle of projection of said spokes to said rim is defined by said bores as a first predetermined magnitude relative to a horizontal plane perpendicular to the longitudinal axis of said spoked wheel, said plurality of spokes having a second predetermined angular projection to said rim from said plane perpendicular to said longitudinal axis of said spoked wheel when said spokes are tensioned between said hub and said spoked wheel, said first predetermined magnitude of said angular projection being approximately at least as twice as great as said second predetermined magnitude of said angular projection.

10. The improvement of claim 9 wherein said first predetermined angular projection is approximately 20 degrees, and wherein said second predetermined angular projection is approximately between 8 and 9 degrees.

11. A method of assembling a spoked wheel having a hub and a plurality of spokes coupling said hub to said spoked wheel such that said spokes remain fixed in their substantially originally trued condition even after said spoked wheel is subjected to high impulsive stresses, said method comprising the steps of:

providing a rigid, integral hub having bell-shaped hub flanges on opposing ends of said hub;

defining a plurality of spoke bores in said bell-shaped flange at a projection angle with respect to a plane perpendicular to said longitudinal axis of said hub, said projection angle having a first predetermined magnitude;

disposing said plurality of spokes through said bores, each spoke having a head for preventing said spoke from being pulled through said bore; and coupling the opposing end of said spokes disposed through said bores to said spoked wheel while simultaneously bending said spokes by a second predetermined magnitude so that a torque is applied to said spoke to dynamically bend said spokes in a plane lying parallel to said longitudinal axis of said hub and at a position on said spoke proximate to said head where said spoke contacts said hub.

12. The method of claim 11 wherein said step of simultaneously bending bends said spokes outwardly in order to decrease the angle of projection of said spoke from said plane perpendicular to said longitudinal axis of said hub.

13. A method of assembling a spoked wheel having a hub and a plurality of spokes coupling said hub to said spoked wheel such that said spokes remain fixed in their substantially originally trued condition even after said spoked wheel is subjected to high impulsive stresses, said method comprising the steps of:

providing a rigid, integral hub having bell-shaped hub flanges on opposing ends of said hub;

defining a plurality of spoke bores in said bell-shaped flange at a projection angle with respect to a plane perpendicular to said longitudinal axis of said hub, said projection angle having a first predetermined magnitude;

disposing said plurality of spokes through said bores, each spoke having means for preventing said spoke from being pulled through said bore; and coupling the opposing end of said spokes disposed through said bores to said spoked wheel while simultaneously bending said spokes by a second predetermined amount so that a torque is applied to said spoke tending to bend said spokes in a plane lying parallel to said longitudinal axis of said hub, wherein said step of simultaneously bending bends said spokes outwardly in order to decrease the angle of projection of said spoke from said plane perpendicular to said longitudinal axis of said hub; and wherein said spoke is bent outward from the center of said spoked wheel to reduce the angle of said spoke from said plane perpendicular to said longitudinal axis of said hub by at least 50 percent of said angle of said spoke from said plane prior to said step of bending.

14. The method of claim 13 wherein said original projection angle of said spoke relative to said plane perpendicular to said longitudinal axis of said hub is approximately 20 degrees and wherein said angle of said spoke after being bent toward said plane perpendicular to said longitudinal axis of said hub is 9 degrees or less.

* * * * *